United States Patent [19]
Glynn

[11] Patent Number: 5,181,181
[45] Date of Patent: Jan. 19, 1993

[54] COMPUTER APPARATUS INPUT DEVICE FOR THREE-DIMENSIONAL INFORMATION

[75] Inventor: Brian J. Glynn, Merritt Island, Fla.

[73] Assignee: Triton Technologies, Inc., Burke, Va.

[21] Appl. No.: 588,824

[22] Filed: Sep. 27, 1990

[51] Int. Cl.⁵ .................. G01P 7/00; G01P 15/00; G09G 1/00
[52] U.S. Cl. .................. 364/566; 340/710; 364/709.11
[58] Field of Search .......... 364/560, 453, 709.11, 364/565, 566; 340/710, 706; 178/18-20; 73/505

[56] References Cited

U.S. PATENT DOCUMENTS

| | | | |
|---|---|---|---|
| 3,541,541 | 11/1970 | Engelbart | 178/18 X |
| 3,835,464 | 9/1974 | Rider | 340/710 |
| 3,892,963 | 7/1975 | Hawley et al. | 250/231.16 |
| 3,898,445 | 8/1975 | MacLeod et al. | 356/141 |
| 3,987,685 | 10/1976 | Opocensky | 340/710 |
| 4,241,409 | 12/1980 | Nolf | 340/705 |
| 4,390,873 | 6/1983 | Kirsch | 340/710 |
| 4,409,479 | 10/1983 | Sprague et al. | 33/1 M |
| 4,578,674 | 3/1986 | Baker et al. | 340/710 |
| 4,608,641 | 8/1986 | Snell | 364/453 X |
| 4,617,634 | 10/1986 | Izumida et al. | 364/453 X |
| 4,682,159 | 7/1987 | Davison | 340/706 |
| 4,688,184 | 8/1987 | Taniguti et al. | 364/560 |
| 4,695,831 | 9/1987 | Shinn | 340/707 |
| 4,754,268 | 6/1988 | Mori | 340/710 |
| 4,766,423 | 8/1988 | Ono et al. | 340/709 |
| 4,787,051 | 11/1988 | Olson | 364/518 |
| 4,812,829 | 3/1989 | Ebina et al. | 340/709 |
| 4,835,528 | 5/1989 | Flinchbaugh | 340/709 |
| 4,839,838 | 6/1989 | LaBiche et al. | 364/709.11 |
| 4,887,230 | 12/1989 | Noguchi et al. | 364/560 |
| 4,916,650 | 4/1990 | Oikawa | 364/453 X |
| 4,922,444 | 5/1990 | Baba | 364/566 |
| 5,001,647 | 3/1991 | Rapiejko et al. | 364/453 |

*Primary Examiner*—Thomas G. Black
*Assistant Examiner*—Michael Zanelli
*Attorney, Agent, or Firm*—Burns, Doane, Swecker & Mathis

[57] ABSTRACT

A mouse which senses six degrees of motion arising from movement of the mouse within three dimensions. A hand-held device includes three accelerometers for sensing linear translation along three axes of a Cartesian coordinate system and three angular rate sensors for sensing angular rotation about the three axes. Signals produced by the sensors are processed to permit the acceleration, velocity and relative position and attitude of the device to be conveyed to a computer. Thus, a person may interact with a computer with six degrees of motion in three-dimensional space. Computer interface ports and unique address identification ensure proper communication with the computer regardless of the orientation of the mouse.

21 Claims, 7 Drawing Sheets

COMPUTER APPARATUS INPUT DEVICE FOR THREE-DIMENSIONAL INFORMATION

BACKGROUND OF THE INVENTION

The present invention relates to a computer peripheral input device used by an operator to control cursor position or the like. More particularly, the invention is directed to an apparatus and method for inputting position, attitude and motion data to a computer in, for example, terms of three-dimensional spatial coordinates over time.

Most computer systems with which humans must interact, include a 'cursor' which indicates current position on a computer display. The cursor position may indicate where data may be input, such as the case of textual information, or where one may manipulate an object which is represented graphically by the computer and depicted on a display. Manipulation of the cursor on a computer display may also be used by an operator to select or change modes of computer operation.

Early means of cursor control were centered around the use of position control keys on the computer keyboard. These control keys were later augmented by other devices such as the light pen, graphics tablet, joystick, and the track ball. Other developments utilized a device called a 'mouse' to allow an operator to directly manipulate the cursor position by moving a small, hand-held device across a flat surface.

The first embodiment of the mouse detected rotation of a ball which protrudes from the bottom of the device to control cursor position. As the operator moves the mouse on a two dimensional surface, sensors in the mouse detect rotation of the ball along two mutually perpendicular axes. Examples of such devices are illustrated in U.S. Pat. Nos. 3,541,541; 3,835,464; 3,892,963; 3,987,685; and 4,390,873. U.S. Pat. No. 4,409,479 discloses a further development which utilizes optical sensing techniques to detect mouse motion without moving parts.

These mouse devices all detect and convey motion within two dimensions. However, with the increased use of computers in the definition, representation, and manipulation of information in terms of three-dimensional space, attempts have been made to devise techniques that allow for the definition of positional coordinates in three dimensions. Advances of computer graphical display and software technology in the area of three-dimensional representation of information has made desirable the capability of an operator to input and manipulate or control more than merely three-dimensional position information, but also three-dimensional motion and attitude information. This is particularly true in the case of modeling, simulation, and animation of objects that are represented in either two or three-dimensional space.

U.S. Pat. No. 3,898,445, issued to MacLeod et al., relates to a means for determining position of a target in three dimensions by measuring the time it takes for a number of light beams to sweep between reference points and comparing that with the time required for the beams to sweep between the reference points and the target.

U.S. Pat. No. 4,766,423, issued to Ono et al., and U.S. Pat. No. 4,812,829, issued to Ebina et al., disclose display and control devices and methods for controlling a cursor in a three-dimensional space by moving the cursor as if to maneuver it by use of joystick and throttle type devices to alter the direction and velocity of a cursor.

U.S. Pat. No. 4,835,528, issued to Flinchbaugh, illustrates a cursor control system which utilizes movement of a mouse device upon a two-dimensional surface that contains logically defined regions within which movement of the mouse is interpreted by the system to mean movement in three-dimensional space.

None of the three-dimensional input devices noted above has the intuitive simplicity that a mouse has for interacting in two dimensions. A three-dimensional input device disclosed in U.S. Pat. No. 4,787,051 to Olson utilizes inertial acceleration sensors to permit an operator to input three-dimensional spatial position. However, the disclosed device does not consider input of either motion or 'orientation', henceforth referred to herein as 'attitude'.

To determine changes in position within a plane, the Olson system senses translation from a first accelerometer. Rotation is obtained from the difference in translational acceleration sensed by the first accelerometer and a second accelerometer. This technique mandates precision mounting of the accelerometer pair, as well as processing to decouple translation from rotation and to determine both the rotational axis and rate. Thus, the device disclosed by Olson et al. requires extensive processing by the computer which may render the device incompatible with lower end computing devices. Additionally, this technique would require highly sensitive accelerometers to obtain low rotational rates.

In the Olson device, analog integrator circuits are used for the first stage of integration required to obtain displacement from acceleration. These integrator circuits have limits in dynamic range and require periodic resets to zero to eliminate inherent errors of offset and drift. The Olson device also constrains the use of the remote device to a limited range of orientation with respect to the computer in order to permit proper communication. Furthermore, no provision is made in the Olson system to prevent interference from signals originating from nearby input devices which control nearby computer work stations.

Accordingly, one of the objects of the present invention is to provide a new and improved device that overcomes the aforementioned shortcomings of previous computer input techniques.

Additionally, a primary object of the present invention is to provide a means for an operator to input to a computer information which allows the computer to directly ascertain position, motion and attitude of the input device in terms of three-dimensional spatial coordinates.

It is another object of the present invention to provide a new and improved apparatus and method for controlling movement of a cursor, represented on a computer display in terms of three-dimensional spatial coordinates.

It is yet another object of the present invention to provide an apparatus and method for providing input to a computer, position, motion, and attitude with a device which is intuitively simple to operate by the natural motion of a person, for the purpose of conveying a change in position or attitude, in a particular case, or a change in the state of variables, in the general case.

SUMMARY OF THE INVENTION

In accordance with one embodiment of the present invention, a computer input device apparatus detects and conveys to a computer device positional information within six degrees of motion—linear translation along, and angular rotation about, each of three mutually perpendicular axes of a Cartesian coordinate system. The preferred embodiment of the present invention includes three accelerometers, each mounted with its primary axis oriented to one of three orthogonally oriented, or mutually perpendicular, axes. In this way, each accelerometer independently detects translational acceleration along one of the primary axes of a three-dimensional Cartesian coordinate system. Each accelerometer produces a signal which is directly proportional to the acceleration imparted along its respective primary axis.

Additionally, the preferred embodiment includes three orthogonally oriented rate sensors, each mounted in such a way that each primary axis is parallel or collinearly oriented with each of the respective aforementioned accelerometer primary axes. Each rate sensor independently detects angular rotational rates about an individual axis of the Cartesian coordinate system and produces a signal which is directly proportional to the angular momentum, or angular rotational displacement rate, which is detected as the rate sensor rotates about its respective primary axis.

Additional aspects of the preferred embodiment of the present invention include techniques for producing velocity and position vectors of the input device. These vectors, each consisting of a scalar magnitude and a direction in terms of a three-dimensional Cartesian coordinate system, are continually updated to reflect the instantaneous input device velocity as well as its position and attitude, relative to an arbitrary stationary initial position and attitude.

The velocity vector is determined from the geometric sum of the acceleration integrated once over time, as indicated by signals produced by the three accelerometers. The velocity vector may be expressed in terms of a velocity at which the input device is moving and a direction of motion. The direction of motion can be defined by two angles indicating the direction the device is moving relative to the input device coordinate system.

The relative position vector is determined from the geometric sum of the accelerations integrated twice over time, as indicated by signals produced by the three accelerometers. The relative position vector may be expressed in terms of a linear displacement from the arbitrary initial origin 'zero coordinates' of the input device and a direction, defined by two angles, indicating the position of the device relative to the initial position.

The relative attitude may be determined from the rate of change in rotational displacements integrated once over time as indicated by signals produced by the three rate sensors. The relative attitude is expressed in terms of angular displacements from the arbitrary initial attitude 'zero angles', normalized to a maximum rotation of 360° ($2\pi$ radians) about each of the three axes of the input device, indicating the attitude of the device relative to the initial attitude.

Additional aspects of the preferred embodiment of the present invention include push-button switches on the input device which may be actuated by the operator to convey to a computer a desire to change an operating state. Examples of operating state changes include providing a new input device initial position or attitude, or indicating a new computer cursor position, or changing a mode of operation of the computer and/or the input device.

Additional aspects of the preferred embodiment of the present invention include a wireless interface between the input device and a computer. The wireless interface permits attributes of the input device motion and push-button actuation to be communicated to a computer in a manner that allows for motion to be unencumbered by an attached cable. Preferably, the interface is bi-directional, allowing the computer to control certain aspects of the input device operational states. In an additional embodiment of the input device, the interface between the device and a computer may be a cable.

BRIEF DESCRIPTION OF THE DRAWINGS

The aforementioned and other objects, features, and advantages of the present invention will be apparent to the skilled artisan from the following detailed description when read in light of the accompanying drawings, wherein.

DETAILED DESCRIPTION OF THE PREFERRED EMBODIMENT

Figure 1A:
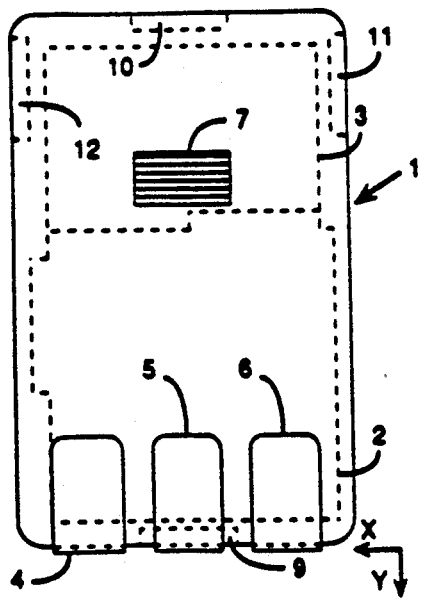
FIG. 1(a) is a top view of an input device in accordance with the present invention.
Figure 1D:
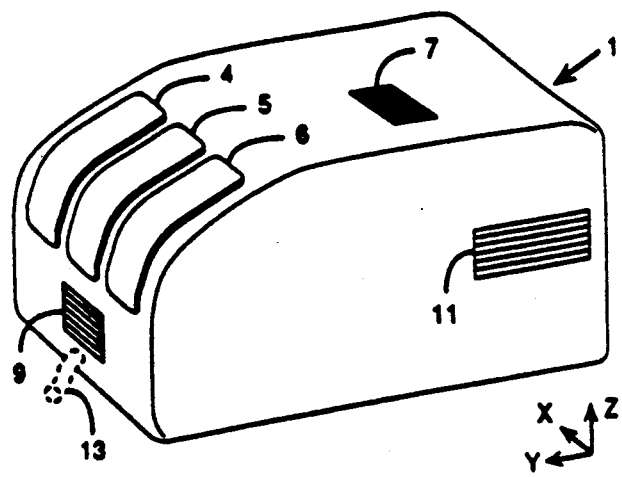
FIG. 1(d) is a perspective view of the input device of FIG. 1(a)
Figure 1B:
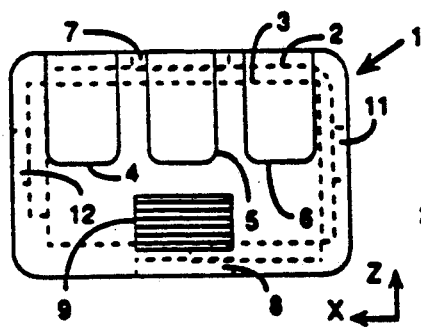
FIG. 1(b) is a front view of the input device of FIG. 1(a)
Figure 1C:
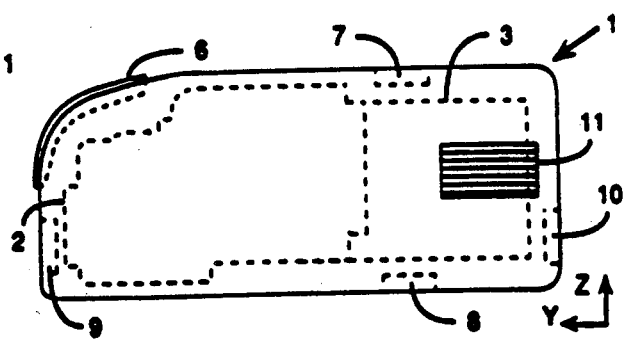
FIG. 1(c) is a side view of the input device of FIG. 1(a)

Referring to FIGS. 1(a) through 1(d), a hand-held computer input device or 'mouse' 1 is illustrated which includes a plurality of interface ports 7-12. As shown, each external face of the mouse 1 is provided with an interface port. Each of these interface ports may provide communication with the computer through known wireless communication techniques, such as infrared or radio techniques. Thus, regardless of the orientation of the mouse 1 with respect to the computer work station, at least one interface port will be directed generally at the computer.

During operation, the interface ports are operated simultaneously to transmit or receive signals. Since at least one of the interface ports generally faces the computer at all times, communication with the computer is permitted regardless of the orientation of the mouse. As will be described below in greater detail, the system may include apparatus for avoiding interference from nearby devices when operated in a relatively crowded environment. Alternatively, communication with the computer may be established through an interface cable 13.

The mouse 1 may also include a plurality of push-buttons 4, 5 and 6 for additional interaction of the operator with the host computer system. The push-buttons may be used, for example, to provide special command signals to the computer. These command signals are transmitted through the interface ports 7-12 or the cable interface 13, to the computer.

Preferably, the push-buttons are positioned on an angled surface of the mouse 1 to allow easy actuation by an operator from at least two different orientations of the mouse device. Alternatively, multiple sets of push-buttons may be provided to permit easy actuation. Individual push-button sets may be arranged, for example, on opposed faces of the mouse 1 and connected in parallel to permit actuation of command signals from any one of the multiple push-button sets. Additionally, push-buttons which detect and convey a range of pressure applied to them, as opposed to merely conveying a change between two states, may be provided in an alternative embodiment.

The push-buttons can be operated to perform a number of functions. For example, actuation of a push-button may command the system to reset the zero reference point from which the relative position and attitude of the mouse 1 is measured. Additionally, the position and attitude attributes of the mouse 1 may be held constant, despite movement, while a push-button is depressed. The push-buttons may also function to indicate a desire by the operator to indicate a point, line, surface, volume or motion in space, or to select a menu item, cursor position or particular attitude.

Numerous other examples of the function of push-buttons 4, 5, and 6 could be given, and although no additional examples are noted here, additional functions of the push-buttons will be apparent to the skilled artisan. Furthermore, additional embodiments of the mouse 1 may include more or fewer than three push-buttons. A motion sensing assembly 2 and an ancillary components area 3 are indicated by phantom dashed lines in FIGS. 1(a)-1(c). In an alternative embodiment of the present invention, components included in the ancillary components area 3, as described herein, may be contained within a separate chassis remote from the mouse 1. In such an embodiment, the mouse 1 would contain only the motion sensing assembly 2.

Figure 2A:
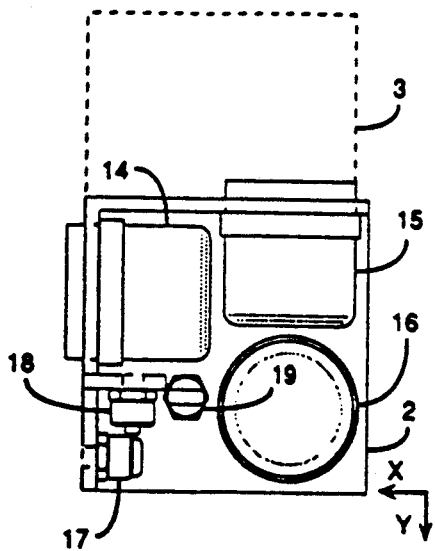
FIGS. 2(a)-2(c) are cut-away top, front and side views, respectively, of the device of FIG. 1, illustrating the motion sensing assembly and ancillary components area of the input device.
Figure 2B:
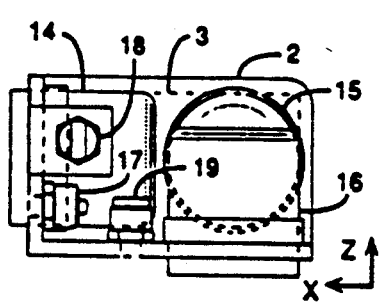
Figure 2C:
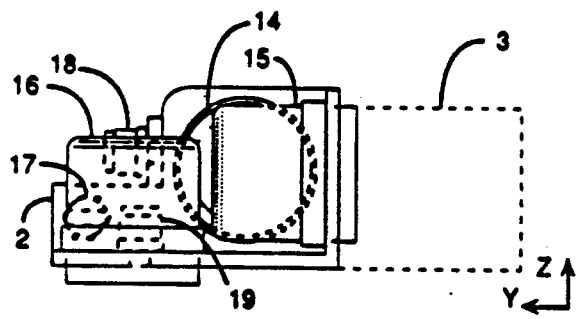

Turning now to FIGS. 2(a)-2(c), the motion sensing assembly 2 includes conventional rotational rate sensors 14, 15 and 16, and accelerometers 17, 18 and 19 aligned on three orthogonal axes. Rotational rate sensor 14 and accelerometer 17 are aligned on a first axis; rotational rate sensor 15 and accelerometer 18 are aligned on a second axis perpendicular to the first axis; and rotational rate sensor 16 and accelerometer 19 are aligned on a third axis perpendicular to both the first axis and the second axis.

By mounting the rotational rate sensors 14, 15 and 16 and the accelerometers 17, 18 and 19 in the foregoing manner, the motion sensing assembly 2 simultaneously senses all six degrees of motion of the translation along, and rotation about, three mutually perpendicular axes of a Cartesian coordinate system. Translational accelerations are sensed by the accelerometers 17, 18 and 19, which detect acceleration along the X, Y and Z axes, respectively, and produce an analog signal representative of the acceleration. Similarly, rotational angular rates are detected by the rotational rate sensors 14, 15 and 16, which sense rotational rates about the X, Y and Z axes, respectively, and produce an analog signal representative of the rotational rate.

The motion sensing assembly 2 is referred to numerous times below. For simplification, the general term 'sensors' shall be used herein to describe the motion sensing assembly 2 or its individual components described above.

Figure 3:
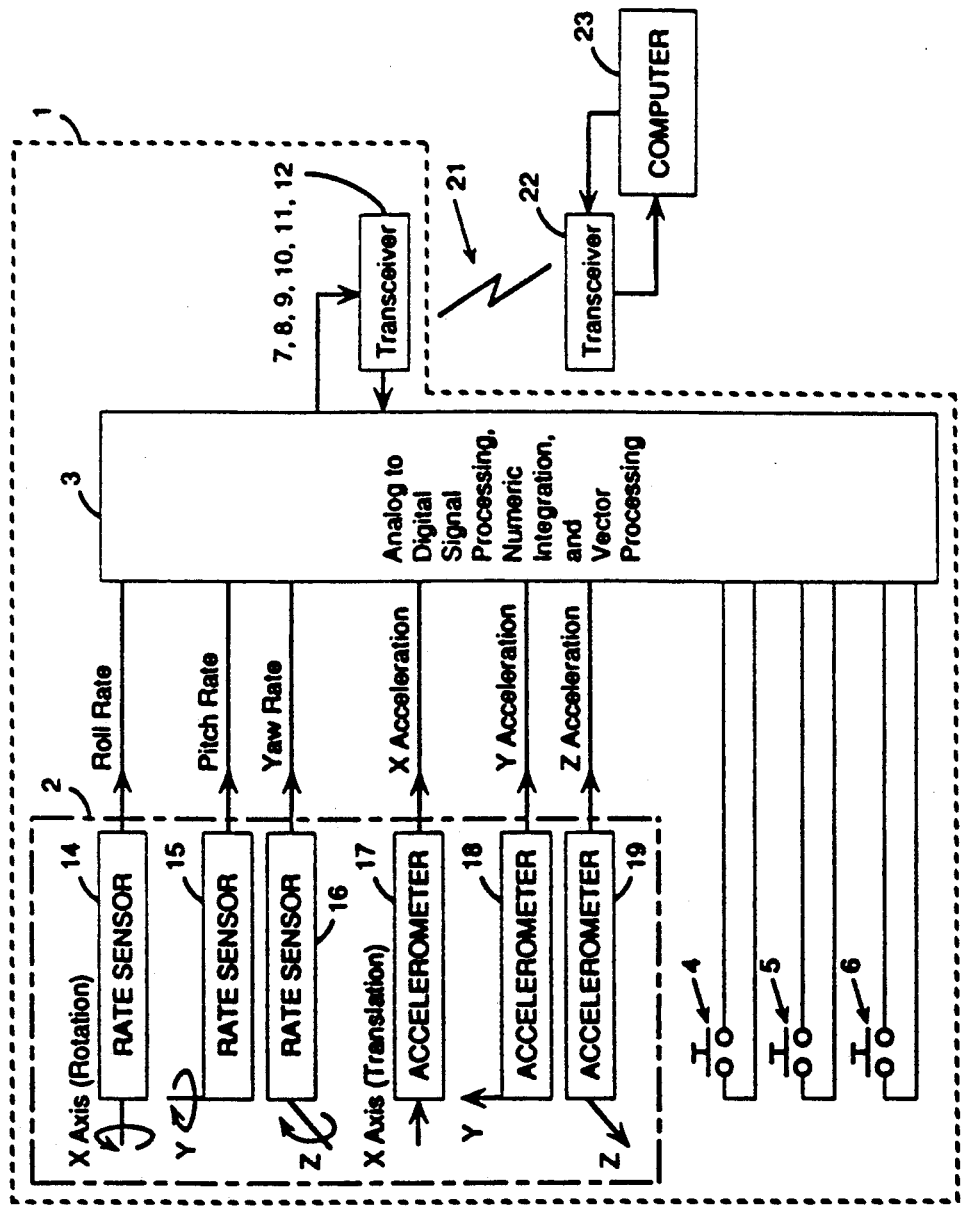
FIG. 3 is a block diagram of the major functional elements of the preferred embodiment of the present invention, including a wireless interface to a computer.

FIG. 3 is a system block diagram which depicts major functional elements included in the motion sensing assembly 2 and ancillary components area 3 of the mouse 1 of FIG. 1, and the wireless interface 21 between the mouse transceivers 7-12 and a transceiver 22 associated with a computer 23. Sensor signals from the individual components of the motion sensing assembly 2 are provided to circuits in the ancillary components area 3 which performs processing of the sensor signals. Information regarding the sensor signals is then provided to mouse transceivers 7-12 for communication to the computer transceiver 22. Functions performed within the ancillary components area 3, labeled analog to digital signal processing, numeric integration, and vector processing, will be further described below.

Figure 4:
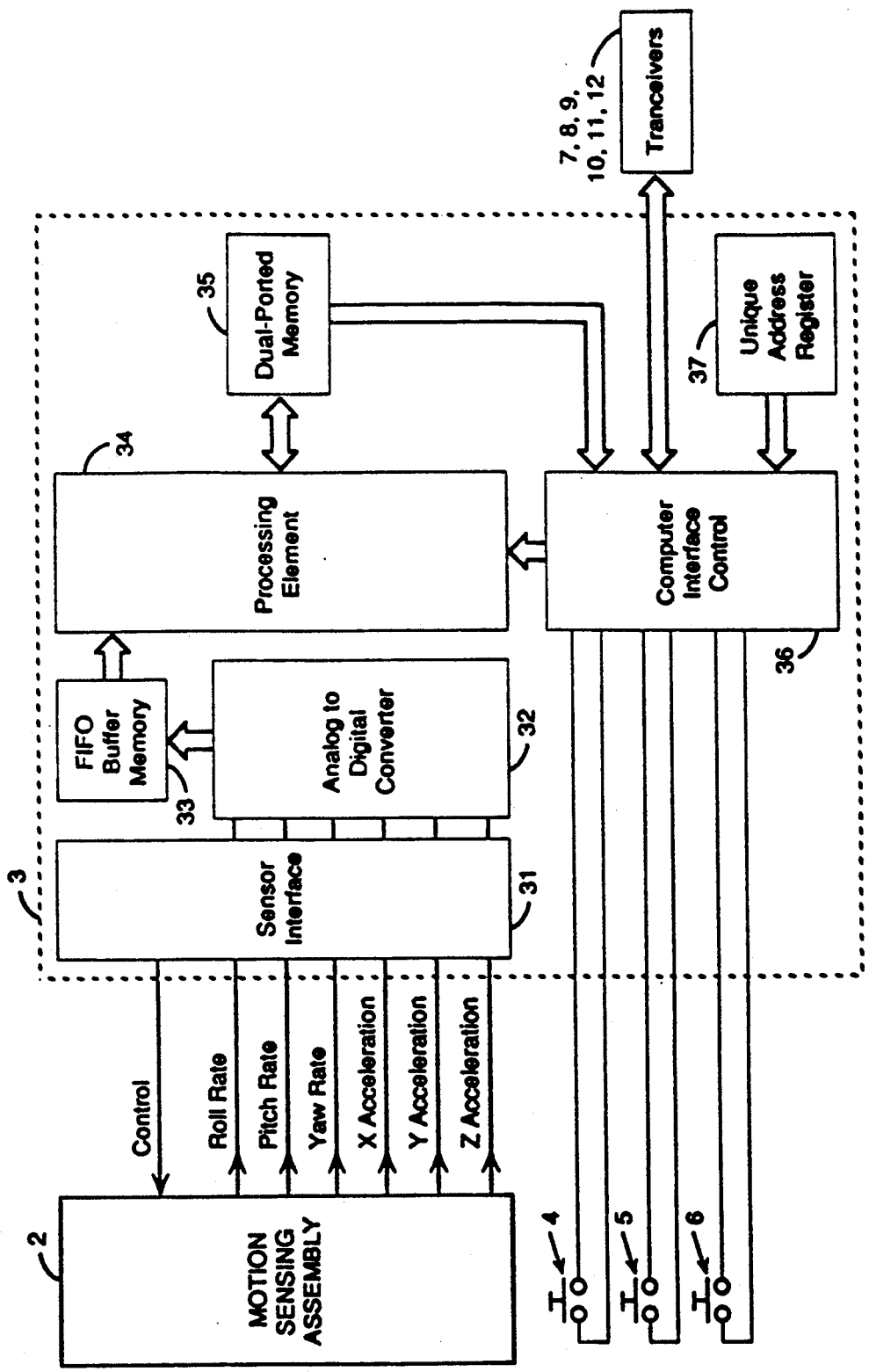
FIG. 4 is a block diagram showing additional detail on major processing elements of the preferred embodiment of the present invention.

FIG. 4 is a block diagram of the preferred embodiment of the mouse 1 of FIG. 1. Sensor interface circuits 31 provides electrical power to the components of the motion sensing assembly 2 and bias and control circuits to ensure proper operation of the sensor components. Additionally, sensor interface circuits 31 preferably include amplification circuitry for amplifying sensor signals from the motion sensing assembly 2.

Amplified sensor signals are provided to analog-to-digital converter 32 which converts the amplified analog sensor signals into corresponding quantized digital signals. The analog-to-digital converter 32 preferably includes a single channel which multiplexes sequentially through the respective sensor signals. Alternatively, the analog-to-digital converter may include six channels, with individual channels dedicated to individual sensor signals.

The digitized sensor signals from the analog-to-digital converter 32 are stored in a first-in-first-out (FIFO) buffer memory 33 for further processing by processing element 34. The FIFO buffer memory 33 is preferably organized as a single memory stack into which each of the respective digitized sensor signals is stored in sequential order. The FIFO buffer memory 33 may alternatively be organized with six separate memory areas corresponding to the six sensor signals. In other words, a separate FIFO stack is provided for digitized sensor signals from each of the six motion sensing components of the motion sensing assembly 2. By providing the FIFO buffer memory 33, the mouse 1 compensates for varying processing speeds in processing element 34 and eliminates the need for elaborate synchronization schemes controlling the operation between the 'front-end' sensor interface 31 and analog-to-digital converter 32, and the 'back-end' processing element 34 and computer interface control 36.

The processing element 34 is preferably a conventional microprocessor having a suitably programmed read-only memory. The processing element 34 may also be a suitably programmed conventional digital signal processor. Briefly, the processing element 34 periodically reads and numerically integrates the digitized sensor signals from the FIFO buffer memory 33. Three-dimensional motion, position and attitude values are continually computed in a known manner based on the most recent results of the numerical integration of the sensor data, the current zero position and attitude information, and the current processing configuration established by push-button or computer commands. Information processed by the processing element 34 is stored in dual-ported memory 35 upon completion of processing by known techniques such as direct memory access. This information may then be sent via interface ports 7-12 to the computer by a computer interface control 36.

Numerical integration is performed continually on the digital acceleration and rate values provided by the sensors. Numeric integration of digital values allows for a significant dynamic range which is limited only by the amount of memory and processing time allocated to the task. In addition to numerical integration, the processing element 34 computes and applies correction values which compensate for the effects of gravity and the translational effects of rotation on the linear sensors, i.e. both gravitational accelerations and tangential velocities. Additionally, by establishing a threshold level for motion signals above which the signals are attributable to operator movements of the mouse 1, the processing element 34 effectively reduces or eliminates errors which might be induced by sensor drift, earth rotational effects and low level noise signals that may be present when an operator is not moving the mouse.

The processing element 34 responds to external commands by changing the processing configuration of the calculation processes. For example, in one processing mode the sensor value for any axis, or axes, will be ignored upon computation of the three-dimensional motion and position values. These external commands would normally be initiated by an operator actuating one of the three push-button switches 4, 5, or 6. The computer interface control 36 detects actuation of the push-buttons 4-6 and sends corresponding command data to the computer. Upon receipt of the command data, the computer returns command data to the computer interface control 36 which, in turn, provides command data to the processing element 34 to change the processing configuration. Another external command initiated from the push-buttons may result in the processing element 34 clearing all numeric integration accumulators and setting initial condition registers to zero, thereby causing future position and attitude computations to be relative to a new physical location and attitude of the mouse.

Utilization of the dual-ported memory 35 permits the external computer to be provided position updates in near real-time, since the processing element 34 is provided concurrent access to the memory. In this manner, the processing element 34 may make the current position, attitude and motion values available to the external computer as soon as new computations are completed. Since current relative position, attitude and motion are continually computed, as opposed to being computed upon request, this approach ensures that the most recent data is always available to the external computer.

Several computers are often operated within relatively close proximity to one another. In such environments, it is possible that signals transmitted over a wireless communications channel by a mouse may be received by an unassociated computer. Similarly, signals transmitted by a computer may be received by an unassociated mouse. Such interference would be even more likely with the use of the mouse of FIG. 1 since the mouse includes transceivers oriented in virtually all directions.

In accordance with another feature of the present invention, a unique address register 37 is included in the ancillary components area 3 to help prevent interference caused by adjacent computer work stations. The unique address register 37 allows numerous mouse devices to operate within close proximity of one another without interference. An address unique to the mouse is appended to the push-button commands, and the motion, attitude and position data, before they are transmitted by the mouse. These transmissions may be accomplished by known serial data communication protocols. The computer compares this address with an address stored in the computer to ensure that the received signal is from the proper mouse. Similarly, all commands received by the mouse are screened by the computer interface control 36, to verify that the commands are destined for the particular mouse defined by the unique address. Commands addressing a mouse with an address different than that address contained in the unique address register 37 are ignored. Reset or hold commands containing an address which matches the address contained in the unique address register 37 are transferred to the processing element 34, which then resets, or holds constant, appropriate values in memory.

Figure 5:
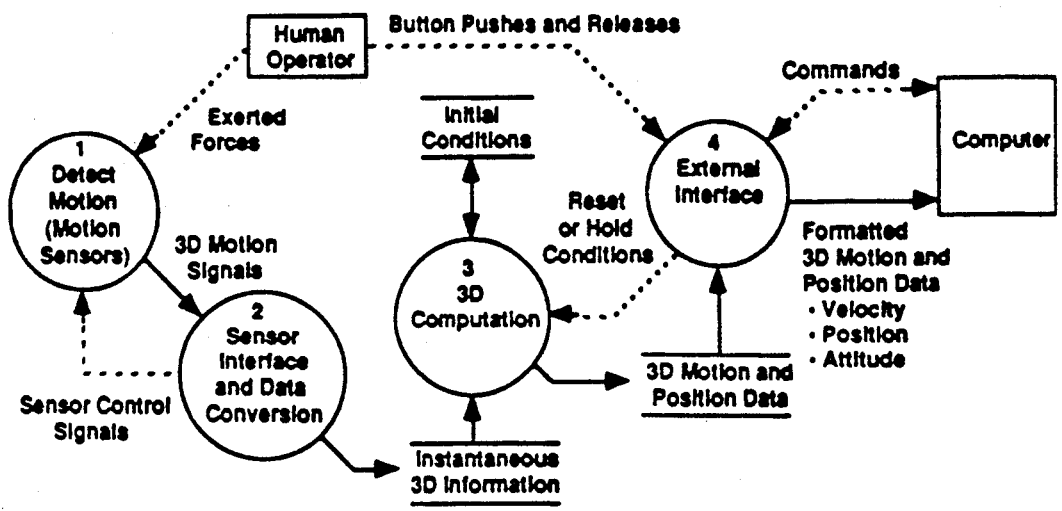
FIG. 5 is a process flow diagram illustrating the functions used by the preferred embodiment in processing input device motion, push-button status and external computer interface.

FIG. 5 is a process flow diagram illustrating processes used in accordance with the preferred embodiment to input three-dimensional data to a computing device. In the preferred embodiment, these processes are implemented primarily in hardware as described in connection with FIGS. 1-4. As will be recognized by the practitioner, however, software implementations of some processes is also possible.

In FIGS. 5-10, external devices or influences are shown as rectangular boxes. For example, in FIG. 5, sources or consumers of data or control such as a human operator or a host computer are indicated by rectangular boxes. Additionally, solid line circles indicate logical collections of functionality, dashed line circles are used to indicate logical collections of control, solid lines indicate the flow of data, dashed lines indicate the flow of control, and open ended rectangles represent temporary repositories of data called 'data stores'.

Referring to FIG. 5, a human operator exerts forces on the mouse which are detected by the sensors in process 1, resulting in three-dimensional motion signals being sent to process 2. There, the signals are converted to instantaneous values and stored. These stored instantaneous values are subsequently passed to process 3 where computations are made to generate the three-dimensional motion and position data that is passed to the computer 23 via the external interface. Process 4 handles all communication between the mouse 1 and the computer 23 via a bi-directional link 21. Process 4 also detects the human operator's actuation and release of pushbutton switches 4, 5, and 6 and passes this information to the computer 23. Commands to reset to zero, or hold constant, initial conditions are also received and processed in process 4. In an additional embodiment of the present invention, process 4 detects the magnitude of pressure applied to pressure sensitive push-buttons and passes this information to the computer.

The processes described above in connection with FIG. 5 represent major functional elements of the preferred embodiment of the present invention. These processes are decomposed in FIGS. 6–10 to lower level diagrams where each process of the preferred invention is expanded upon below to show underlying subprocesses. Process 1 is implemented by the motion sensing assembly 2 previously described. Accordingly, process 1 will not be further discussed.

Figure 6:
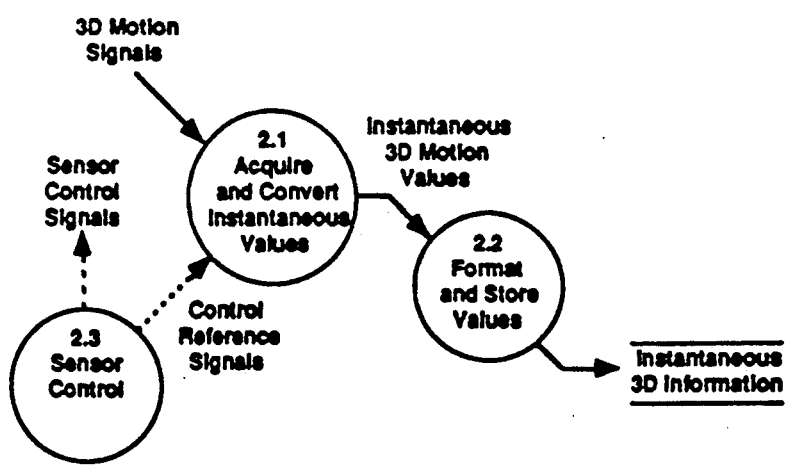
FIG. 6 is a process flow diagram illustrating motion sensing assembly interface functions, and further illustrating details of the sensor interface and data conversion process of FIG. 5.

The decomposition of process 2 of FIG. 5 is depicted in FIG. 6. Process 2.1 synchronizes the sensors and acquires the instantaneous values of the time varying three-dimensional motion signals from the sensors. In the preferred embodiment of the present invention, where the acquired motion signals are analog, the sensor outputs are periodically sampled and quantized. In process 2.2, the quantized signals for all six degrees of motion in three dimensions are formatted into digital values representing instantaneous three-dimensional information and stored for further processing. Referring again to FIGS. 3 and 4 as discussed above, the analog-to-digital converter 32 preferably is multiplexed between the analog sensor signals and provides quantized digital signals which are stored in buffer memory 33. Conventional power, bias, timing, and control signals used in sensor operation, synchronization, and calibration are provided by process 2.3. Additional reference signals may also be provided to process 2.1 if required by the sensor to synchronize with the data acquisition function.

Figure 7:
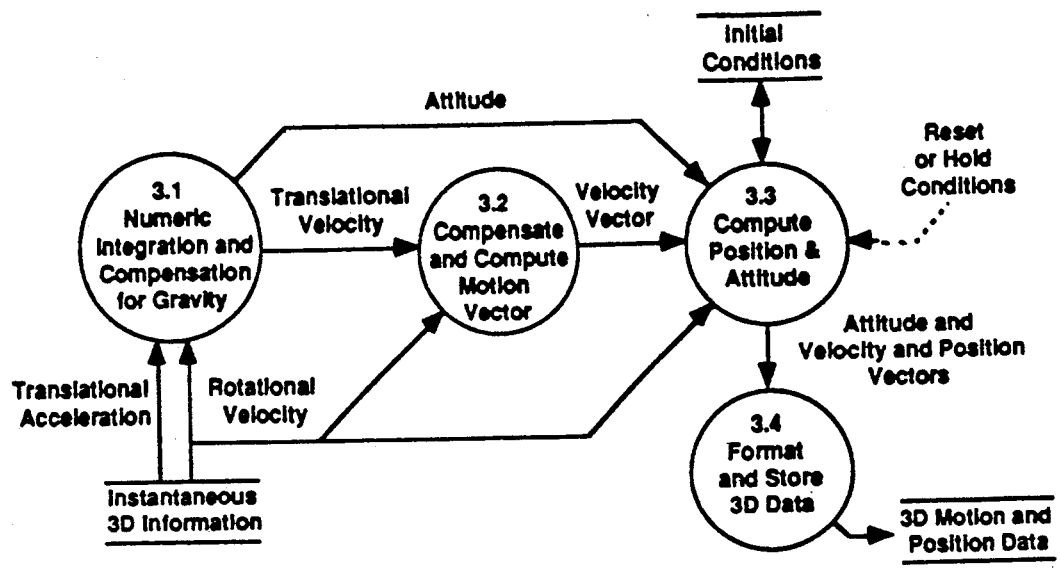
FIG. 7 is a process flow diagram showing velocity and position calculation functions, and illustrating further details of the three-dimensional computation process of FIG. 5.

FIG. 7 depicts the decomposition of process 3 of FIG. 5. The instantaneous three-dimensional information, consisting of a translational acceleration value and a rotational rate value for each of the three axes, is provided in digital format by process 2 of FIG. 5. The translational acceleration data is passed to process 3.1, and the rotational rate data is passed to processes 3.1, 3.2 and 3.3. Process 3.1 numerically integrates over time the instantaneous rotational velocity values for each of the X, Y and Z axes, resulting in a rotational displacement value for each axis, representing the motion sensing assembly attitude. Process 3.1 uses this attitude information to compensate for the gravitational effect of the earth on the translational acceleration sensors. As an example to explain this effect, if the motion sensing assembly was oriented in an attitude such that the Z axis was perpendicular to the surface of the earth, then the Z axis accelerometer would detect a force equal to the full force of gravity, even in the absence of force applied by an operator, i.e. when the mouse is at rest. In general, when a translational acceleration sensor axis is oriented to a nonzero angle with respect to a perpendicular of the local gravitational force, then some portion of that force will be detected by the sensor. Based on the computed attitude of the sensors, process 3.1 will compute and compensate for that portion of acceleration detected by each translational acceleration sensor which is attributable to the force of gravity. Process 3.1 then numerically integrates in a conventional manner these compensated translational acceleration values for each of the X, Y, and Z axes to produce a translational velocity value for each of the three dimensions. In the embodiment of FIGS. 3 and 4, these functions are implemented by the processing element 34 which, as previously noted, reads the sensor values from the buffer memory 33 for further processing.

Figure 8:
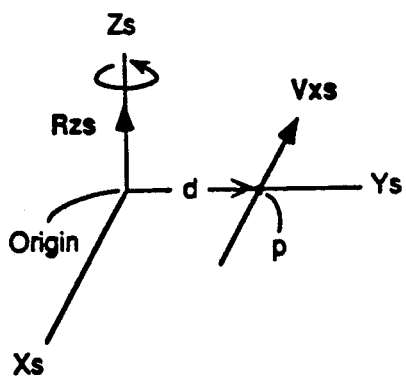
FIG. 8 depicts a tangential velocity arising from rotation of the input device.

Process 3.2 computes and compensates for translational velocity effects that are attributable to rotation. These effects arise from the inability to mount the different sensors such that their primary axes reside at a single physical point. This effect is depicted in FIG. 8, where the main axis of the accelerometer sensing Xs axis translation is at a point p displaced a distance d from the origin of the Cartesian coordinate system used by the motion sensor assembly 2. As the three-dimensional mouse undergoes a change in rotational rate about the sensor axis Zs, the Xs axis accelerometer will detect the tangential motion. Process 3.1 computes the resulting sensor velocity Vxs related to the product of the rotational rate vector Rzs and the distance d which is then compensated for by process 3.2. Given the physical mounting attributes of the sensors, the rotational rates sensed, and the translational velocities provided by process 3.1, process 3.2 compensates the sensor data for the tangential velocities of the X, Y, and Z axis translational sensors. Using this compensated data, process 3.2 computes the three-dimensional velocity, called the velocity vector, and passes information describing the velocity vector to process 3.3. Specifically, the velocity vector is preferably expressed in terms of a velocity amplitude and a direction defined by two angles indicating the direction the device is moving relative to the mouse coordinate system.

Process 3.3 takes the velocity vector from process 3.2, numerically integrates it over time, and computes the translational displacement for each axis. Using these translational values and the rotational displacement values passed from process 3.1, process 3.3 computes the new position and attitude relative to the initial position and attitude defined in an initial conditions data store.

When initiated by external commands received from the computer, process 3.3 will reset to zero, or hold to a constant, the values contained in the initial conditions data store which describe the initial position and attitude of the three-dimensional mouse. Upon command from the computer 23, the internal accumulators used for the numerical integration of the position and attitude data will be reset to zero. This will have the effect of making the initial position coincident with the current position and attitude of the mouse. Subsequent position calculations in process 3.3 would be relative to this new initial position and attitude. Similarly, initial conditions can be set to constant values and the aforementioned accumulators held to these constants. This would allow for mouse motion of a given degree, or degrees, of freedom to be ignored by process 3.3, allowing for an operator to restrict the conveyance of motion to the computer 23 to two dimensional space, for example.

Finally, process 3.4 formats and stores the motion and position data.

Figure 9:
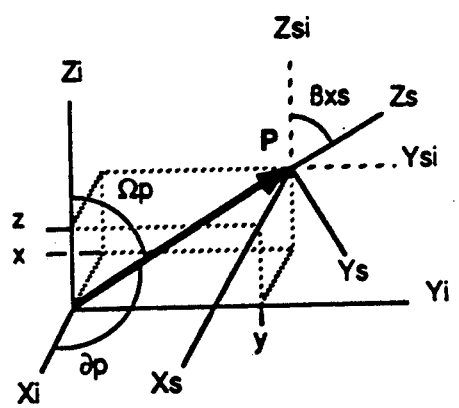
FIG. 9 depicts translation and rotation from initial coordinates of a coordinate system centered on the input device.

FIG. 9 depicts an example of a computed scalar value and the accompanying angles, p and Ωp for the position vector P. Displacement of the sensors by x, y, and z values along the initial position Xi, Yi, and Zi axes, respectively are shown. Also shown is the sensor attitude after a sensor Xs axis rotation of βsx, with respect to the initial sensor attitude of the Ysi and Zsi axes. An example of a velocity vector, which would look similar to the position vector except that it would be referenced to the sensor centered coordinate system of the Xs, Ys and Zs axes is not shown in FIG. 9.

Figure 10:
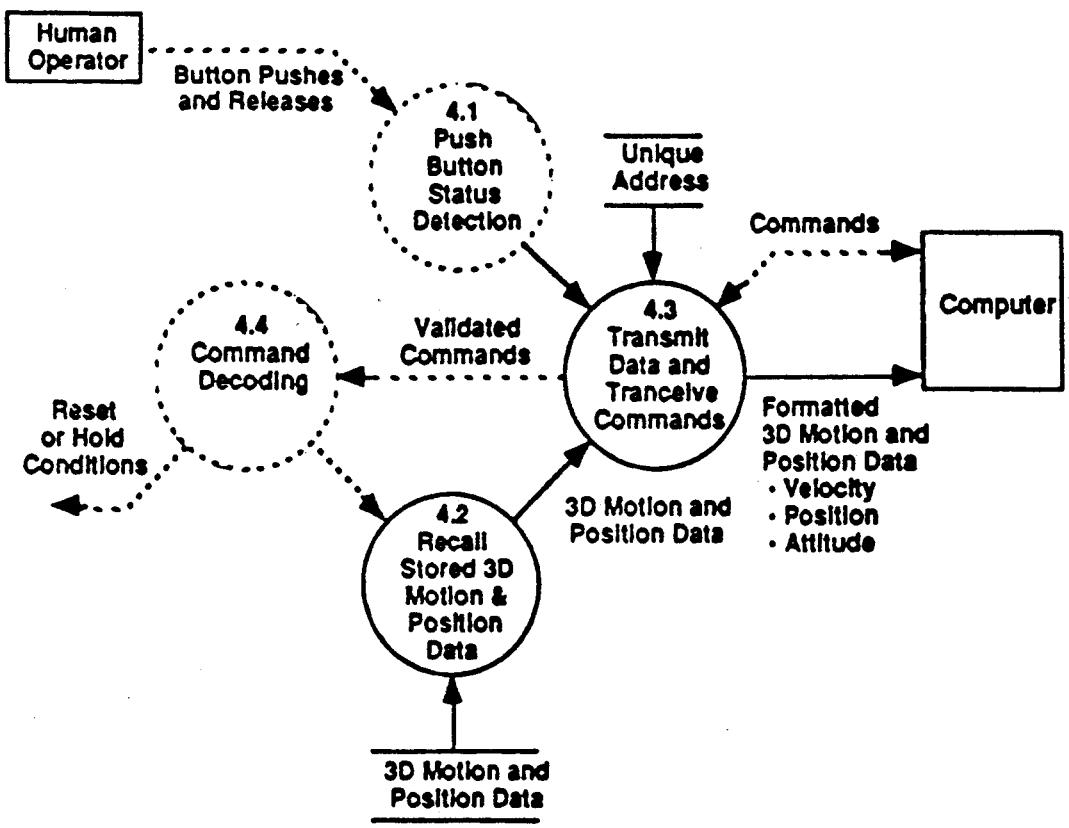
FIG. 10 is a process flow diagram illustrating the functions used in processing changes in status of push-buttons, and in providing external interface to a computer, and illustrating further details of the external interface process of FIG. 5.

FIG. 10 depicts the decomposition of process 4 of FIG. 5, which serves as the external interface for the preferred embodiment. Actuation or release of any of the push-button switches 4, 5, or 6 is detected in process 4.1. In an alternative embodiment of the present invention, pressure applied to the push-buttons is detected in process 4.1. This status change information is passed to process 4.3 for transmission to the computer in the form of commands. When directed by appropriate control, process 4.2 will extract the previously stored three-dimensional motion and position data and pass it to process 4.3 for transmission to the computer. Process 4.3 receives commands from, and transmits commands and formatted motion and position data to the computer. All commands and data formatted for transmission from process 4.3 include unique address information to allow the computer to distinguish the associated mouse from other mouse devices operating within reception range. Similarly, all commands received by process 4.3 include address information to be compared by the mouse to the unique address to validate the command by verifying that the mouse is receiving commands from the correct computer, as opposed to another computer operating within close proximity to the mouse. These validated commands are passed to process 4.4 for command decoding. Control signals corresponding to the decoded commands are then provided to process 4.2 to transfer motion and position data to process 4.3. Additionally, process 4.4 decodes and transfers commands to process 3 to reset or hold initial conditions.

Although the preferred embodiment is disclosed in terms of a hand-held device, other variations are possible. For example, the computer input device could be mounted on a helmet to detect head movements. Leg movements may be monitored by a computer receiving input from foot and/or leg-mounted input devices. Other arrangements will also be apparent to the skilled practitioner.

Additionally, the motion of the mouse along three dimensions may be interpreted by a computer to mean other than movement within three-dimensional space. For example, movement of the mouse in an upward (Z axis) direction could be used to reflect a change in time or other reference. As an example, an operator could choose information from within a financial data base for different calendar years based on the movement of the input device in the Z axis. Similarly, for developing a two dimensional color graphic image, an operator could indicate the selection of different combinations of colors, or pallets, by moving the input device in the Z axis.

Numerous additional examples could be made of variables controlled by movement of the mouse along each axis, and although no additional examples are cited here, additional functions for control of variables by motion of the mouse all fall within the broader aspects of the spirit of the present invention. Although the preferred embodiment is directed to the conveyance of six degrees of motion to a computer for representation as motion within a three-dimensional Cartesian coordinate system, in a more generalized statement, each degree of freedom associated with motion of the input device, can be used to represent a change of the state of any manner of variables, including motion in three-dimensional space.

The principles, preferred embodiments and modes of operation of the present invention have been described in the foregoing specification. The invention which is intended to be protected herein, however, is not to be construed as being limited to the particular forms disclosed, since these are to be regarded as illustrative rather than restrictive. Variations and changes may be made by those skilled in the art without departing from the spirit of the invention.

What is claimed is:

1. A movable input device for inputting information to a remote computer, comprising
    a generally hexahydral housing;
    means for sensing position, attitude and motion of said movable input device with respect to a three-dimensional coordinate system and producing information describing said position, attitude and motion; and
    wireless means for communicating said information to said remote computer, said wireless communicating means including a plurality of interface ports operating in parallel and provided on said housing, at least one of said interface ports being arranged on each external face of said housing so that at least one interface port will be directed generally at said computer regardless of the orientation of said movable input device with respect to said computer.

2. The device of claim 1, wherein said communicating means includes a unique address indicator to ensure proper communication with said remote computer.

3. The device of claim 1, wherein said wireless communicating means includes an infrared transceiver.

4. An input device for providing information to a computing device, comprising:
    a housing;
    a first acceleration sensor provided in said housing for detecting acceleration along a first axis and producing analog electrical signals having values proportional to the detected acceleration;
    a second acceleration sensor provided in said housing an oriented perpendicular to said first acceleration sensor for detecting acceleration along a second axis perpendicular to said first axis and producing analog electrical signals having values proportional to the detected acceleration;
    a third acceleration sensor provided in said housing and oriented perpendicular to said first and second acceleration sensors for detecting acceleration along a third axis perpendicular to said first and second axes and producing analog electrical signals having values proportional to the detected acceleration;
    a first rotational rate sensor provided in said housing for detecting rotation about said first axis;
    a second rotational rate sensor provided in said housing for directly detecting rotation about said second axis;
    a third rotational rate sensor provided in said housing for directly detecting rotation about said third axis;

an analog-to-digital converter associated with said input device which quantizes said analog acceleration sensor signals to produce digital acceleration sensor values;

a first-in, first-out buffer memory which temporarily stores said digital acceleration sensor values from said analog-to-digital converter in sequential order for later processing;

integrator means associated with said input device for integrating said acceleration signals over time to produce velocity signals for linear translation along each of said first, second and third axes; and communication means associated with said input device for communicating information between said input device and said computing device.

5. The device of claim 4, wherein said integrator means numerically integrates said digital acceleration sensor values.

6. The device of claim 5, further including motion vector computing means responsive to said velocity signals and said rotational rate signals to define a three-dimensional velocity vector.

7. The device of claim 6, wherein said motion vector computing means compensates for translational acceleration detected by said acceleration sensors attributable to rotation of said input device.

8. The device of claim 6, wherein said motion vector computing means compensates for acceleration detected by said acceleration sensors attributable to gravitational acceleration forces.

9. The device of claim 1, further including motion vector computing means responsive to said velocity signals and said rotational rate signals to define a three-dimensional velocity vector.

10. The device of claim 9, wherein said motion vector computing means compensates for translational acceleration detected by said acceleration sensors attributable to rotation of said input device.

11. The device of claim 9, wherein said communication means is wireless and wherein said input device includes a plurality of parallel communication interface ports, at least one of said interface ports being arranged on each external face of said housing so that at least one interface port will be directed generally at said computing device regardless of the orientation of said input device with respect to said computing device.

12. The device of claim 11, wherein communications between said input device and said computing device include a unique address indication to ensure communication with an associated input device and computing device.

13. The device of claim 4, further including processing means for compensating for acceleration detected by said acceleration sensors attributable to gravitational acceleration forces.

14. The input device of claim 4 further including an initial condition data store for storing information defining initial position and orientation of said input device.

15. The input device of claim 14, further including a push-button arranged on said input device operative to cause said computer to produce a command to reset the initial position and orientation information in said initial condition data store of said input device.

16. The device of claim 1, wherein said rotational rate sensors produce electrical signals having values proportional to the detected rate of rotation, and wherein said integrator means integrates said rotation signals and said linear translation velocity signals over time to produce position and attitude values.

17. The device of claim 16, wherein said rotational rate sensors produce analog signal and further including an analog-to-digital converter which quantizes said analog rotation signals to produce digital rotational rate sensor values.

18. The device of claim 17, further including a first-in, first-out buffer memory which temporarily stores said digital rotational rate sensor values from said analog-to-digital converter in sequential order for later processing.

19. An input device for providing information to a computing device, comprising:

a housing;

a first acceleration sensor provided in said housing for detecting acceleration along a first axis and producing electrical signals having values proportional to the detected acceleration;

a second acceleration sensor provided in said housing an oriented perpendicular to said first acceleration sensor for detecting acceleration along a second axis perpendicular to said first axis and producing electrical signals having values proportional to the detected acceleration;

a third acceleration sensor provided in said housing and oriented perpendicular to said first and second acceleration sensors for detecting acceleration along a third axis perpendicular to said first and second axes and producing electrical signals having values proportional to the detected acceleration;

a first rotational rate sensor provided in said housing for directly detecting rotation about said first axis and producing analog signals having values proportional to the detected rate of rotation;

a second rotational rate sensor provided in said housing for directly detecting rotation about said second axis and producing analog signals having values proportional to the detected rate of rotation;

a third rotational rate sensor provided in said housing for directly detecting rotation about said third axis and producing analog signals having values proportional to the detected rate of rotation;

an analog-to-digital converter which quantizes said analog rotation signals to produce digital rotational rate sensor values;

a first-in, first-out buffer memory which temporarily stores said digital acceleration sensor values from said analog-to-digital converter in sequential order for later processing;

integrator means associated with said input device for integrating said acceleration signals over time to produce velocity signals for linear translation along each of said first, second and third axes, and for integrating said rotation signals and said linear translation velocity signals over time to produce position and attitude values; and communication means associated with said input device for communicating information between said input device and said computing device.

20. An input device for providing information to a computing device, comprising:

a housing;

a first acceleration sensor provided in said housing for detecting acceleration along a first axis and producing analog electrical signals having values proportional to the detected acceleration;

a second acceleration sensor provided in said housing an oriented perpendicular to said first acceleration sensor for detecting acceleration along a second axis perpendicular to said first axis and producing analog electrical signals having values proportional to the detected acceleration;

a third acceleration sensor provided in said housing and oriented perpendicular to said first and second acceleration sensors for detecting acceleration along a third axis perpendicular to said first and second axes and producing analog electrical signals having values proportional to the detected acceleration;

a first rotational rate sensor provided in said housing for detecting rotation about said first axis;

a second rotational rate sensor provided in said housing for directly detecting rotation about said second axis;

a third rotational rate sensor provided in said housing for directly detecting rotation about said third axis;

integrator means associated with said input device for integrating said acceleration signals over time to produce velocity signals for linear translation along each of said first, second and third axes;

motion vector computing means responsive to said velocity signals and said rotational rate signals to define a three-dimensional velocity vector; and wireless communication means associated with said input device for communicating information between said input device and said computing device, said input device including a plurality of parallel communication interface ports, at least one of said interface ports being arranged on each external face of said housing so that at least one interface port will be directed generally at said computing device regardless of the orientation of said input device with respect to said computing device.

21. The device of claim 20, wherein communications between said input device and said computing device include a unique address indication to ensure communication with an associated input device and computing device.

* * * * *